United States Patent
Satoh et al.

[11] Patent Number: 5,280,561
[45] Date of Patent: Jan. 18, 1994

[54] METHOD FOR PROCESSING AUDIO SIGNALS IN A SUB-BAND CODING SYSTEM

[75] Inventors: Mihoko Satoh; Hideaki Ebisawa; Yushi Naito, all of Kanagawa, Japan

[73] Assignee: Mitsubishi Denki Kabushiki Kaisha, Tokyo, Japan

[21] Appl. No.: 750,290

[22] Filed: Aug. 27, 1991

[30] Foreign Application Priority Data

Aug. 28, 1990 [JP] Japan .................................. 2-225869

[51] Int. Cl.⁵ .............................................. G10L 5/00
[52] U.S. Cl. ........................................................ 395/2
[58] Field of Search ...................................... 381/34–40, 381/29–33, 46, 47; 379/158; 395/2

[56] References Cited

U.S. PATENT DOCUMENTS

| | | | |
|---|---|---|---|
| 4,811,398 | 3/1989 | Copperi et al. | 381/37 |
| 4,975,657 | 12/1990 | Eastmond | 381/46 |
| 4,989,246 | 1/1991 | Han et al. | 381/40 |
| 5,007,093 | 4/1991 | Thomson | 381/46 |
| 5,054,075 | 10/1991 | Hong et al. | 381/36 |
| 5,086,471 | 2/1992 | Tanaka et al. | 381/36 |

FOREIGN PATENT DOCUMENTS 63-123257 5/1988 Japan .

OTHER PUBLICATIONS

"7 kHz Audio-Coding Within 64 KBIT/S", Recommendation G.722 published in CCITT Blue Book, vol. 111-Fascicle 111.4 pp. 269-341, Nov., 1988.
"Basic Digital Switching" by Shinichi Aizawa, OHM Co. Ltd., pp. 121-124 (FIG. 2.51), Jan. 10, 1983.

*Primary Examiner*—David D. Knepper
*Attorney, Agent, or Firm*—Wolf, Greenfield & Sacks

[57] ABSTRACT

Improvements in a method of processing wideband audio signals by a sub-band coding system are provided. Linear codes having frequency components in which audio signal power is concentrated are selected from linear codes separated into a plurality of frequency band components and decoded. The presence or absence of sound in the audio signals is detected by referring to the selected linear codes and/or a gain coefficient is determined. Level control of the decoded linear codes is performed by using the thus determined gain coefficient.

9 Claims, 9 Drawing Sheets

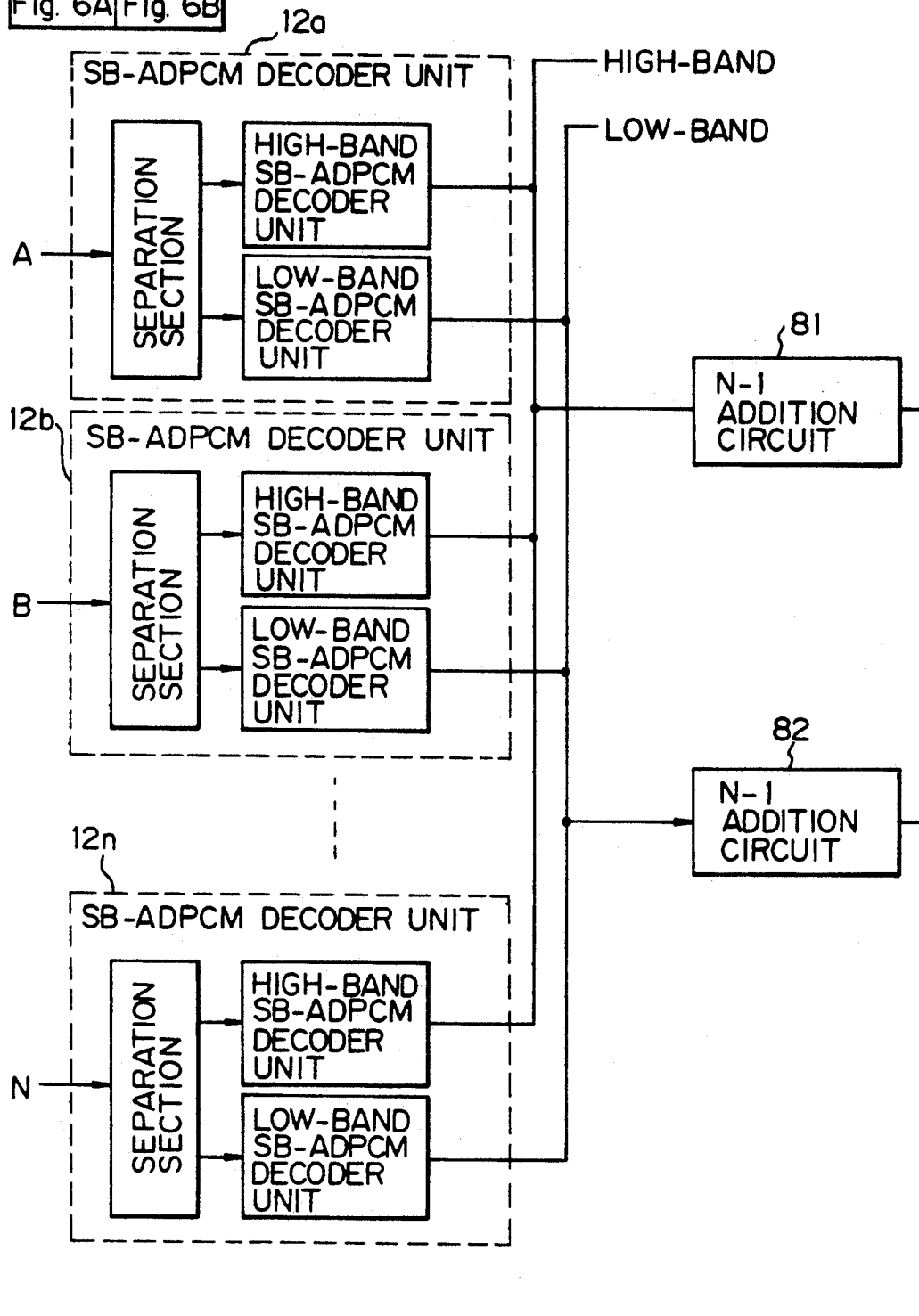

METHOD FOR PROCESSING AUDIO SIGNALS IN A SUB-BAND CODING SYSTEM

BACKGROUND OF THE INVENTION

1. Field of the Invention

The present invention relates to a method of processing audio signals when audio signals are encoded by a sub-band coding system to transmit voice sound efficiently and to a method of processing audio signals in a sub-band coding system whereby such a method is suitable for use with general communication apparatuses, such as a video telephone conference system or the like which can be realized by using the above-mentioned process.

2. Prior Art

A 64K bit/s PCM coding system, which at the present time is the most commonly used voice coding system, is designed to encode voice sounds or acoustic signals in a frequency band of between 300 Hz and 3.4 kHz. With the implementation of this voice encoding technology, component technology, such as a voice detector, a voice level controller, an echo canceller, and voice communication apparatuses, such as an audio teleconference apparatus or the like, in which those technologies are used, have come to be realized by using digital signal processing. As an example of that processing, digital audio signal processing in an audio teleconference apparatus will be explained below.

In voice conference apparatuses, generally, an N−1 addition system is adopted in which the voices of all the subscribers who participate in a conference are connected to a conference trunk apparatus, and then one subscriber receives the added voices of the remaining subscribers.

The N−1 addition system is a system in which after all the signals sent from each subscriber have been added, the signal sent from a particular subscriber is subtracted from it, and the resulting signal is distributed, as a reception signal, to such a subscriber. The name of the system is derived from the fact that when the total number of subscribers is N, the number of signals added as reception signals to each subscriber becomes N−1.

FIG. 1 is a block diagram showing an example of an audio teleconference apparatus which uses the N−1 addition system. This figure is disclosed, as a known technology, in Japanese Patent Laid-Open No. 63-123257 and shows a case of four (4) subscribers, i.e., N=4. The N−1 addition system will now be explained in detail with reference to FIG. 1.

Input codes A, B, C, and D from four subscribers are sequentially converted by an expander 1 into linear codes a, b, c, and d and added by the adder 2 to the output from a shift register 3. The codes from the expander 1 are also supplied to a shift register 4. The addition output from the adder 2 is supplied to the shift register 3 and also to a subtracter 5 where the output from the shift register 4 is subtracted. The subtraction output is supplied to a compressor 7 via an attenuator 6, and converted into PCM codes and sent out.

In the case of a conversation involving 4 subscribers (A, B, C, and D), input code A is first converted into code a by the expander 1 and stacked in the shift registers 3 and 4. The next input code B is similarly converted into code b by the expander 1. Then, it is added by the adder 2 with data 1 stacked in the shift register 3, and then transferred to the shift register 3 again. Concurrently, a code-converted output is also transferred from the expander 1 to the shift register 4 where the output is stacked successively on the data a which has already been stacked.

When operations described above are performed on input codes C and D, the sum of A, B, C, and D (a+b+c+d) is stacked in the shift register 3. The codes (a, b, c, and d) are successively stacked in this order in the shift register 4.

Lastly, when data of the content (a, b, c, and d) of the shift register 4 is sequentially subtracted from the content (a+b+c+d) of the shift register 3 by the subtracter 5, appropriate three-way talk is synthesized. Since these data take the form of simple addition, they may go out of range. Therefore, to prevent this and confine the data to a predetermined range, the data is compressed by a compressor 7 to change it again into PCM codes (non-linear) after it is attenuated by the attenuator 6.

Next, a conventional example is shown in FIG. 2 in which 64K bit/s PCM codes are input to an audio teleconference apparatus using the N−1 addition system in order that the output level is automatically controlled. This figure is also disclosed in Japanese Patent Laid-Open No. 63-123257 showing a case of 4 subscribers. An explanation will now be provided of the operation of FIG. 2. In FIG. 2, the expander 1 and the compressor 7 play the same role as those shown in FIG. 1. Reference numeral 8 denotes an N−1 addition circuit which consists of the shift registers 3 and 4, the adder 2 and the subtracter 5, all of which are shown in FIG. 1.

Expanded audio signals a, b, c, and d of 4 subscribers A, B, C, and D are input to the N−1 addition circuit 8. The sum thereof (a+b+c+d) is output after a predetermined process is performed thereon and then input to an absolute value circuit 9. The output $|a+b+c+d|$ of the absolute value circuit 9 is supplied to a peak hold circuit 10 where the peak value P is maintained for a preset amount of time. The peak value P is supplied to the level control input terminal of a level controller 11, which is in the form of a variable gain amplifier or the like. Addition output from the N−1 addition circuit 8, i.e., data $a'=b+c+d$ for subscriber A, data $b'=a+c+d$ for subscriber B, data $c'=a+b+d$ for subscriber C, and data $d'=a+b+c$ for subscriber D, are input to the level controller 11 sequentially. The output level is controlled, for example, by a gain coefficient G determined by the following equation (1), using the peak value P.

$$G = 1 \quad (0 \leq P < 1) \tag{1}$$
$$G = 1/P \quad (1 \leq P \leq N)$$

where the maximum amplitude level per subscriber is assumed to be 1.

As a result, signals $a''$, $b''$, $c''$, and $d''$ respectively for subscribers A, B, C, and D, whose level is controlled automatically and output, become the following:

$$a'' = G \times a' = G \times (b+c+d)$$

$$b'' = G \times b' = G \times (a+c+d)$$

$$c'' = G \times c' = G \times (a+b+d)$$

$$d'' = G \times d' = G \times (a+b+c)$$

In this way, automatically level-controlled signals are sent out to each subscriber.

In a situation, such as a conference call, where it cannot be determined how many participants are speaking at the same time, an output level which is automatically controlled is highly favored by users. This feature avoids a situation where there is an insufficient signal regardless of the number of participants, and is recognized as one of the functions of the conference call system. As a consequence, when a conference call apparatus is realized by using the conventional 64K bit/s PCM coding system, it is constructed as described above.

Now, there is a great demand for producing high-quality voice sound transmissions. Application of a wide-band voice coding system which encodes audio signals in a frequency band wider than the conventional system has been desired. However, when a system which encodes/decodes at each frequency band of such a wide-band voice coding system, is used just as it is, audio signal processing objectives can sometimes not be achieved. When such an audio teleconference apparatus is used, the following problems arise:

Consideration will now be given to an audio signal processing in a case where 64K bit/s sub-band adaptive differential pulse code modulation (hereinafter abbreviated as SB-ADPCM) which complies with CCITT recommendation G.722 is applied to a conference call apparatus as an example of an audio call apparatus in which a sub-band coding system is applied. In the SB-ADPCM coding system, performing an N−1 addition process by using linear PCM signals of the whole band (50 Hz to 7 kHz) obtained as normal outputs of an encoder is first considered. That is, when N−1 addition is realized concerning the linear PCM signals of the whole frequency band (50 Hz to 7 kHz), a decoder and an encoder are constructed as shown in FIGS. 3 and 4. An N−1 addition circuit is connected between points P1 and P3 shown in the figure and constructed as shown in FIG. 5.

However, CCITT recommendation G.722 that prescribes the specification of the coding system recommends that this voice addition be performed by using linear PCM signals of different bands (50 Hz to 4 kHz, and 4 to 7 kHz) for the following reasons:

(1) Conference call apparatuses can be miniaturized because no sub-band and band synthesizing filters are required.
(2) Signal distortion and increased delay can be prevented because no filters are required.
(3) Easier echo control is possible by being performed in each band.

Therefore, N−1 addition circuits are respectively connected between points P2 and P4 of each band in a case where an N−1 addition circuit is used for linear PCM signals of different bands to utilize the advantages of (1) to (3) above.

FIG. 6 shows an example of a conference call apparatus which is recommended by the above-mentioned CCITT recommendation G.722. The operation of FIG. 6 will be explained below. When 64K bit/s SB-ADPCM codes are applied to the separation section of an SB-ADPCM decoder 12a placed in the transmission line, they are separated into signals of 16k bit/s in which high-band components of audio signals are encoded and signals of 48k bit/s in which low-band components of audio signals are encoded. They are input to a high-band SB-ADPCM decoder unit and a low-band SB-ADPCM decoder unit. Linear PCM signals are output from decoder units of each band and input to N−1 addition circuits 81 and 82 at each band. Linear PCM signals in which N−1 addition processing has been performed are again distributed band by band, to SB-ADPCM encoder units 13a to 13n for respective subscribers. The signals are encoded by the high-band SB-ADPCM encoder unit to SB-ADPCM codes of 16k bit/s and are encoded by the low-band SB-ADPCM encoder unit to SB-ADPCM codes of 48k bit/s. These codes are synthesized in the multiplexing section and become SB-ADPCM codes of 64k bit/s. In the manner described above, such an apparatus can be miniaturized, has higher quality, and processing can be simplified in comparison with the case in which processing is performed by using linear PCM signals of the whole band by performing an N−1 addition process at each band.

As described above, in a conference call apparatus which uses an SB-ADPCM coding system as an example of an audio signal processing utilizing a sub-band coding system, audio signals of 50 Hz to 7 kHz are separated into low band (50 Hz to 4 kHz) and high band (4 to 7 kHz) signals. N−1 addition processing is performed in each band, resulting in the following advantages: "miniaturization of an apparatus"; "maintenance of high quality"; "elimination of extra delay"; and "easy echo control is possible". However, when automatic level control is performed on the result of the addition process, if a technique in which normal audio signal power of all the bands is determined and a gain coefficient is computed on the basis of the power was used, a synthesis of bands is required. In this case, the above-described advantages cannot be obtained. A voice detection process for detecting a silent condition unique to audio signals is also performed normally by referring to audio signal power in all bands. If bands are synthesized for the purpose of only this voice detecting process, a problem arises in that the amount of hardware of an apparatus increases.

SUMMARY OF THE INVENTION

The present invention has been devised in light of the above-described circumstances. Accordingly, an object of the present invention is to provide a method of processing audio signals in a sub-band coding system, which is capable of realizing miniaturization of an apparatus, high quality, and simplification of the process by using a means for outputting detected results by referring to signals of only those frequency bands in which signal power is concentrated and for reflecting this output in all the frequency bands as regards such elements that results are determined from the signal power of the whole frequency band in the prior art, as voice detection and automatic level control in a signal process using a sub-band coding system.

Another object of the present invention is to provide a method for processing audio signals, in which the detection of signals is performed by referring only to those bands in which signal power is concentrated without synthesizing other bands in order to determine the audio signal power of the whole band in a case where a sub-band coding system is used, as an audio coding system, to detect the presence or absence of decoded audio signals, in which coding system audio signals are divided into a plurality of frequency band components and encoded.

A further object of the present invention is to provide a method of processing audio signals, in which a sub-band coding system for dividing audio signals into a plurality of frequency band components is used to encode the signals and in which the level of decoded audio signals is automatically controlled, comprising the steps of determining a gain coefficient by referring only to those bands in which signal power is concentrated without synthesizing other bands; and controlling the level of each band by using this value.

A still further object of the present invention is to provide a method of processing audio signals, in which a sub-band coding system which divides audio signals into a plurality of frequency band components is used, as an audio coding system, to encode the signals, and a multi-location audio teleconference is held, comprising the steps of performing an N-1 addition process at each band; and detecting the voices of each of the conference participants and the automatic control of the audio signals after the N-1 addition process by referring only to those bands in which signal power is concentrated.

A still further object of the present invention is to provide a method of processing audio signals, in which a sub-band coding system which divides audio signals into a plurality of frequency band components is used as a voice coding system, to encode the process, and in which the level of decoded audio signals is automatically controlled, comprising the steps of synthesizing a plurality of bands in which signal power is concentrated to determine a gain coefficient and by referring to those bands without synthesizing all the bands; and controlling the level of each band by using this value.

A still further object of the present invention is to provide a method of processing audio signals, in which a sub-band coding system which divides audio signals into a plurality of frequency band components is used, as an audio coding system, to encode signals, and a multi-location audio teleconference is held using decoded audio signals, comprising the steps of performing an $N-1$ addition process at each band; and detecting the voices of each of the conference participants and the automatic control of audio signals after the $N-1$ addition process by referring only to those bands in which signal power is concentrated.

According to the present invention, when the presence or absence of decoded audio signals is detected in an audio signal process using a sub-band coding system, the process is performed by referring only to those bands in which signal power is concentrated without synthesizing bands to determine audio signal power.

When the level of decoded audio signals is automatically controlled, a gain coefficient is determined by referring only to those bands in which signal power is concentrated without synthesizing other bands and the level of each band is controlled by using this value.

When a multi-location audio teleconference using decoded audio signals is held, an $N-1$ addition process is performed for each band, and the detection of the voices of each of the conference participants and the automatic level control after the $N-1$ addition is made are performed by referring only to those bands in which signal power is concentrated. Thus, an audio teleconference is realized.

When the level of decoded audio signals is automatically controlled, a gain coefficient is determined by referring only to those bands in which signal power is concentrated without synthesizing bands and the level of each band is controlled by using this value.

When a multi-location audio teleconference using decoded audio signals is held, an $N-1$ addition process is performed for each band, and the detection of the voices of each of the conference participants and automatic level control after the $N-1$ addition is made are performed by synthesizing only a plurality of bands in which signal power is concentrated and by referring to those bands. Thus, an audio teleconference is realized.

According to an audio signal processing using a sub-band coding system of the present invention, voice detection, automatic level control and the like can be accomplished by using means for outputting the detected results by referring to only the signals in the frequency band in which the signal power is concentrated and for reflecting the output of the detected results throughout the whole frequency bands, although, in the prior art, they have been obtained from the signal power in the whole frequency bands. It is possible, therefore, to realize miniaturization and high quality of the apparatus, and simplification of the process. The advantages that the sub-band coding system possesses can be obtained without requiring extra hardware. Particularly, when the SB-ADPCM coding system which complies with the CCITT recommendation G.722 is applied to a communication apparatus, the following advantages can be obtained:

(1) Conference call apparatuses can be miniaturized because no sub-band and band synthesizing filters are required.
(2) Signal distortion and increased delay can be prevented because no filters are required.
(3) Easier echo control is possible by being performed in each band.

These and other objects, features and advantages of the present invention will become clear when reference is made to the following description of the preferred embodiments of the present invention, together with reference to the accompanying drawings.

BRIEF DESCRIPTION OF THE DRAWINGS

FIGS. 6A and 6B are views showing the construction of an example of an audio teleconference apparatus in which an SB-ADPCM coding system proposed by CCITT recommendation G.722 is used.

DETAILED DESCRIPTION OF THE PREFERRED EMBODIMENTS

Figure 1:
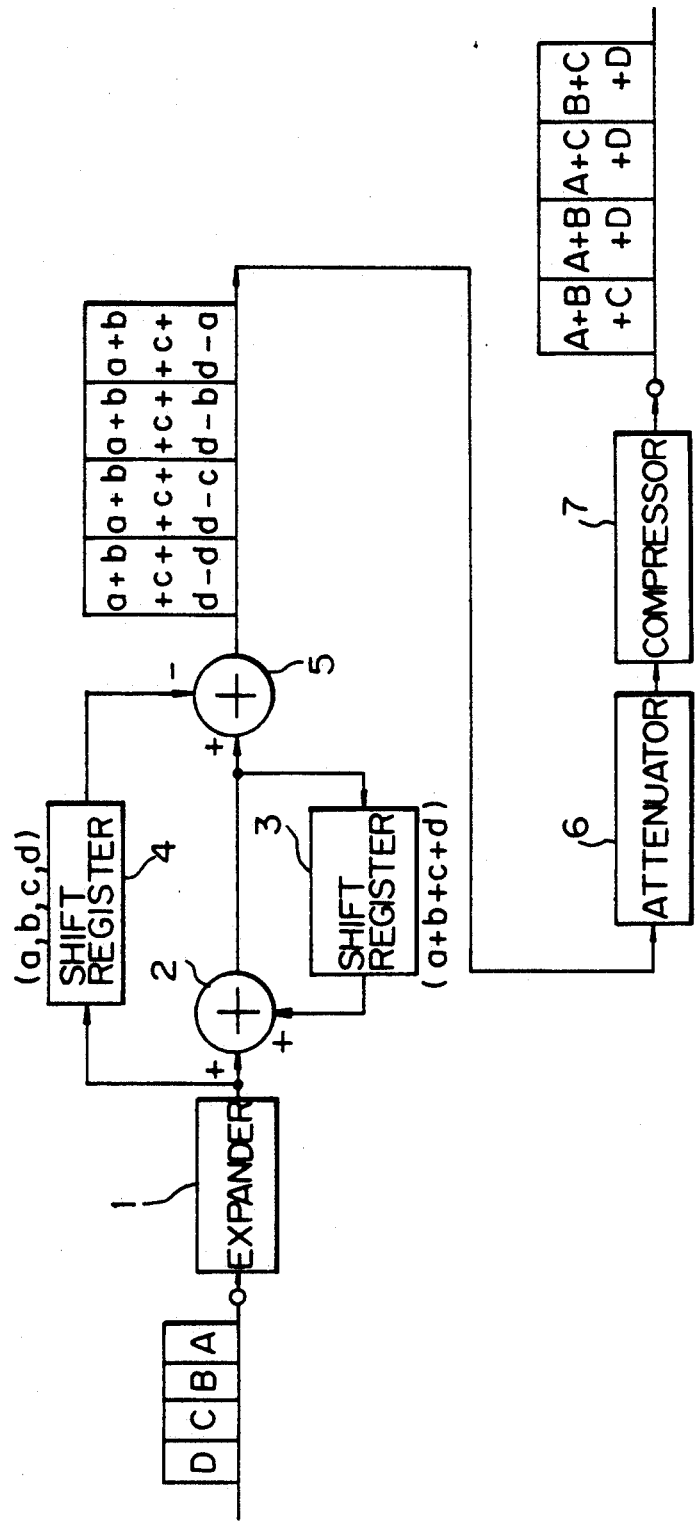
FIG. 1 is a block diagram showing an $N-1$ addition method of the prior art.
Figure 2:
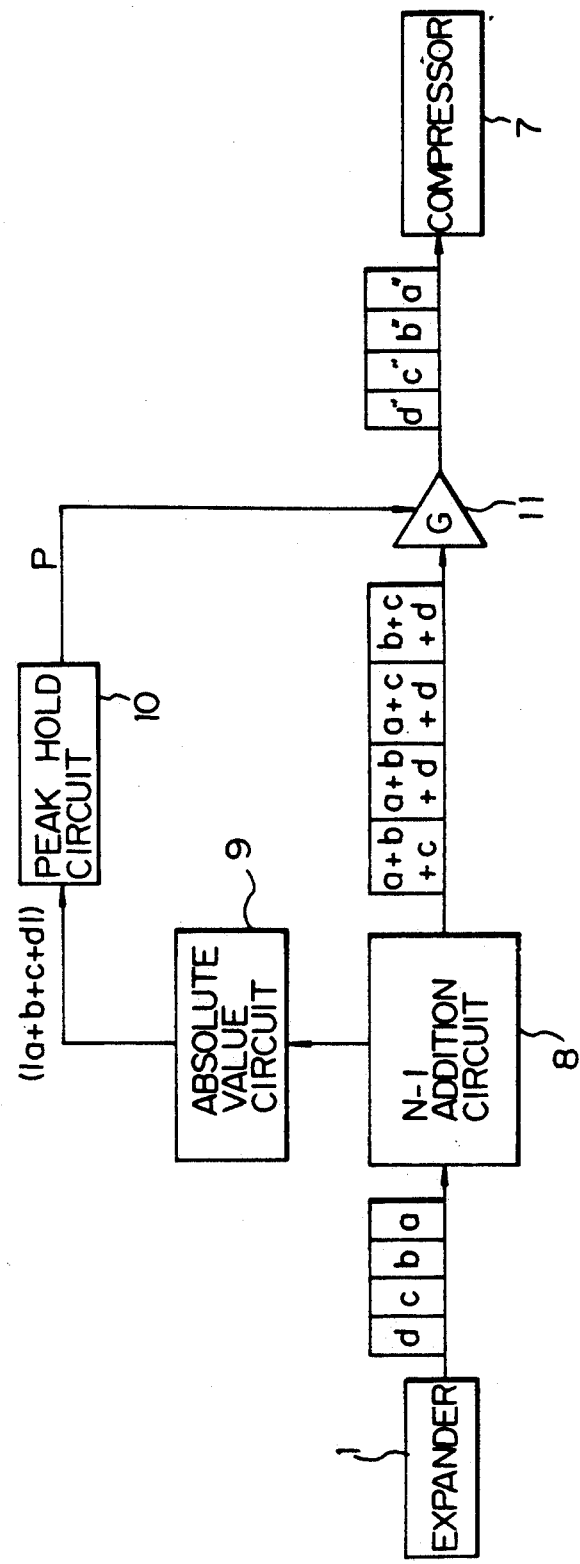
FIG. 2 is a connection diagram of an embodiment showing a conventional audio teleconference apparatus.
Figure 3:
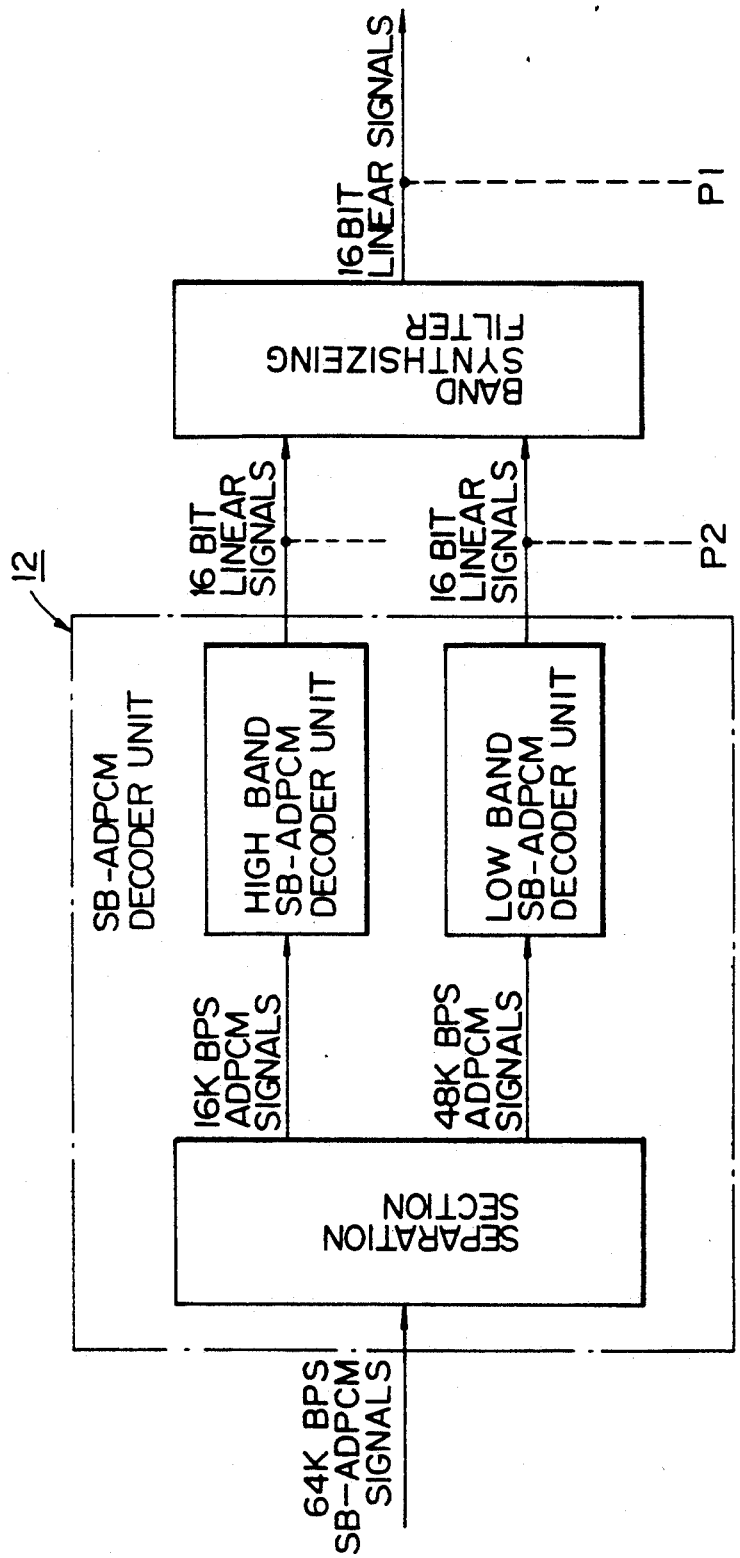
FIG. 3 is a block diagram of an SB-ADPCM decoder unit.
Figure 4:
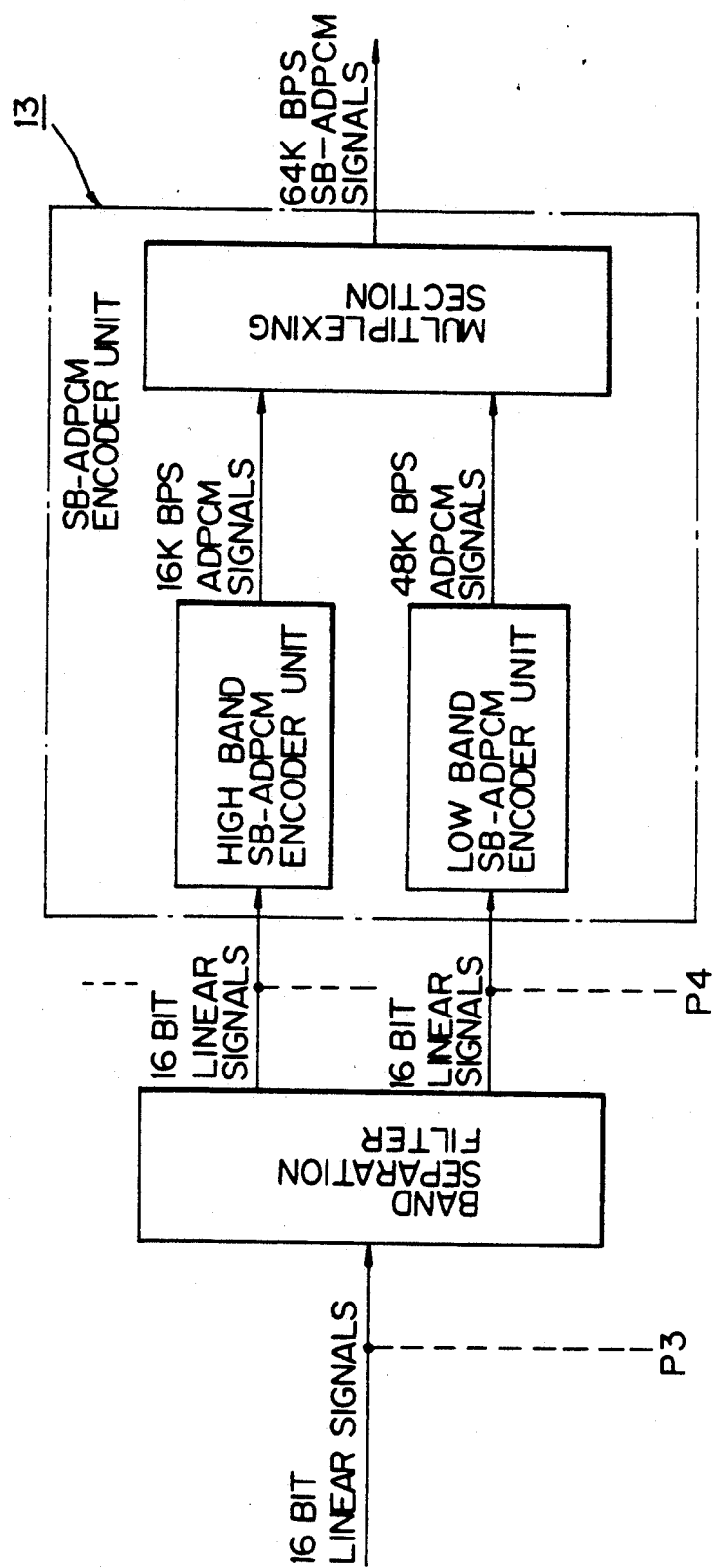
FIG. 4 is a block diagram of an SB-ADPCM encoder unit.
Figure 5A:
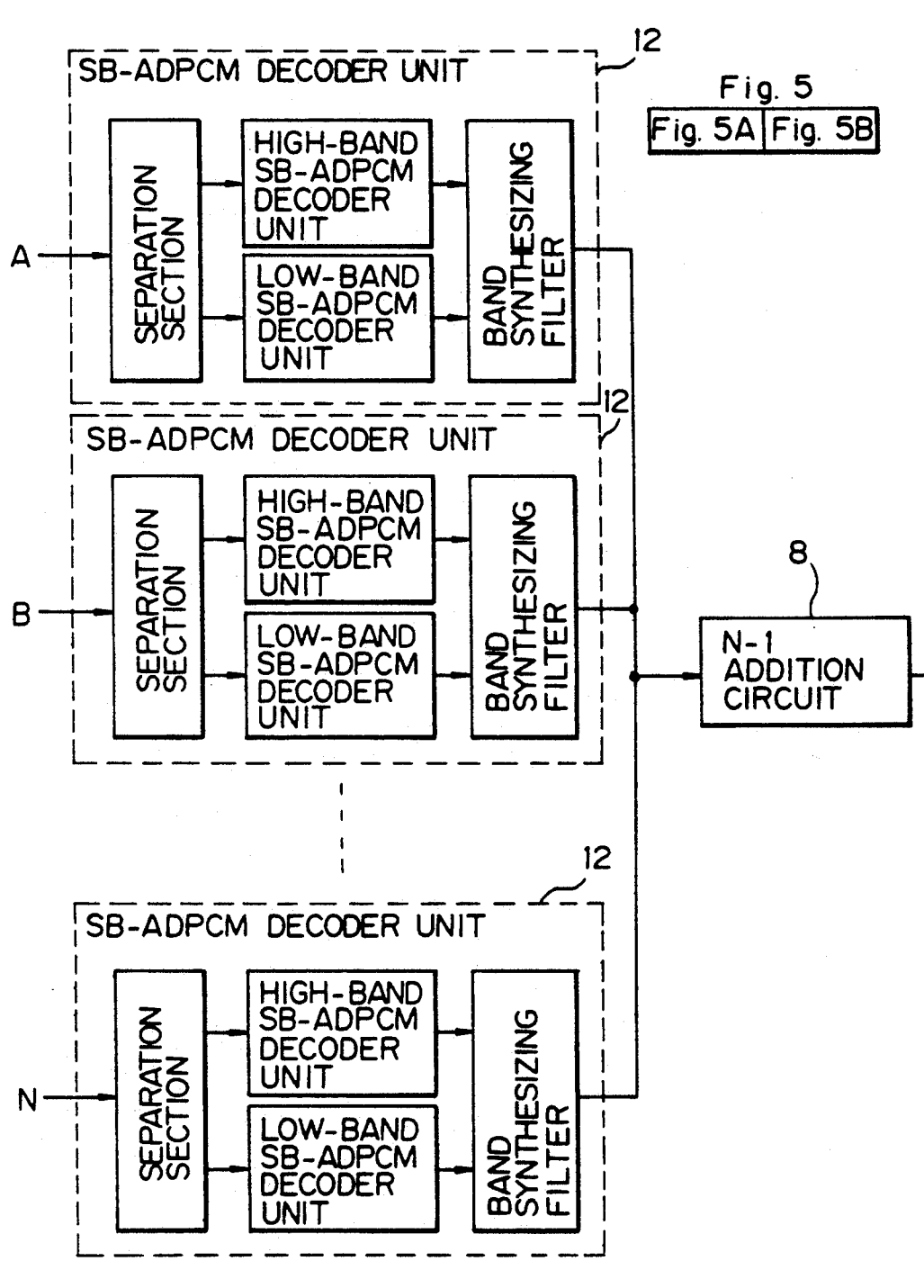
FIGS. 5A and 5B are views showing the construction of an example of an audio teleconference apparatus in a case where the $N-1$ addition is made after bands are synthesized.
Figure 5B:
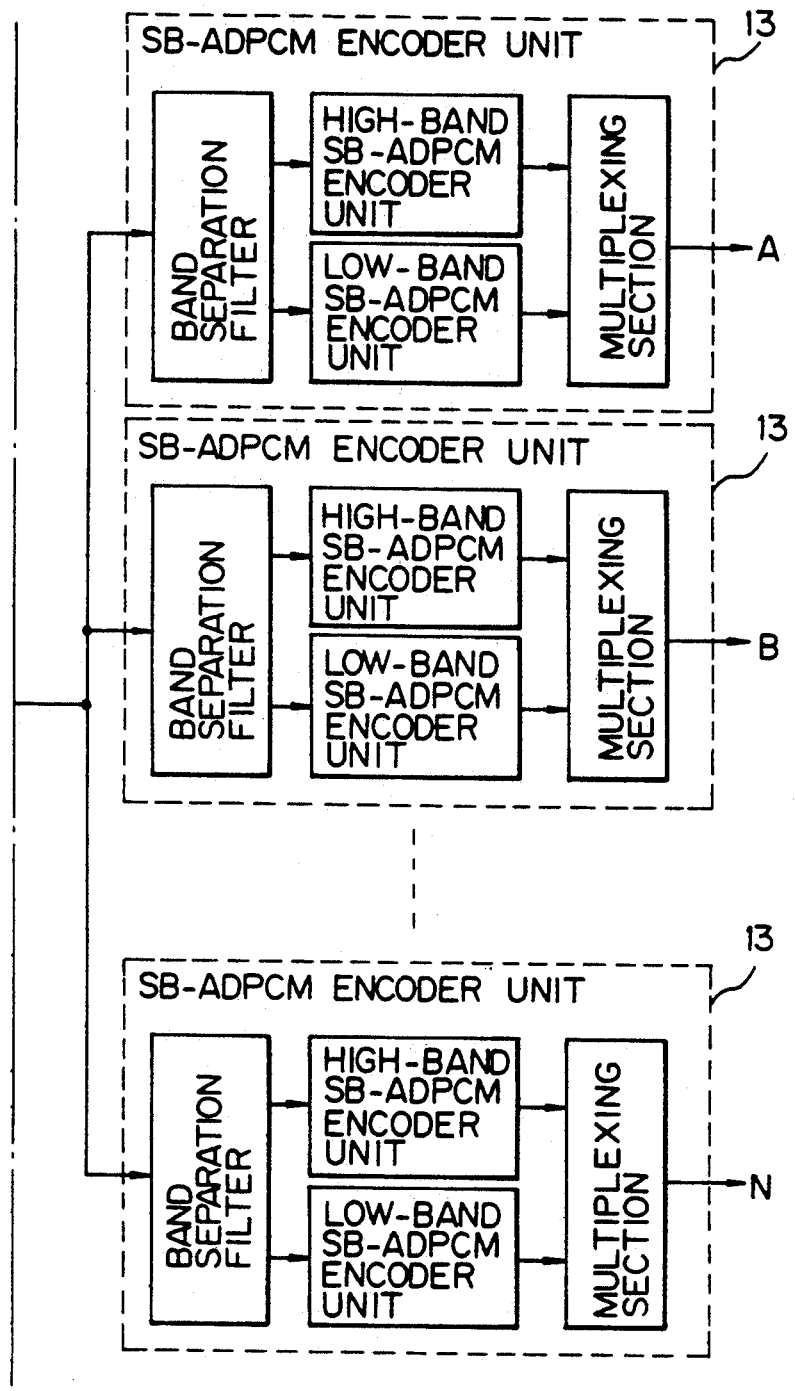
Figure 6B:
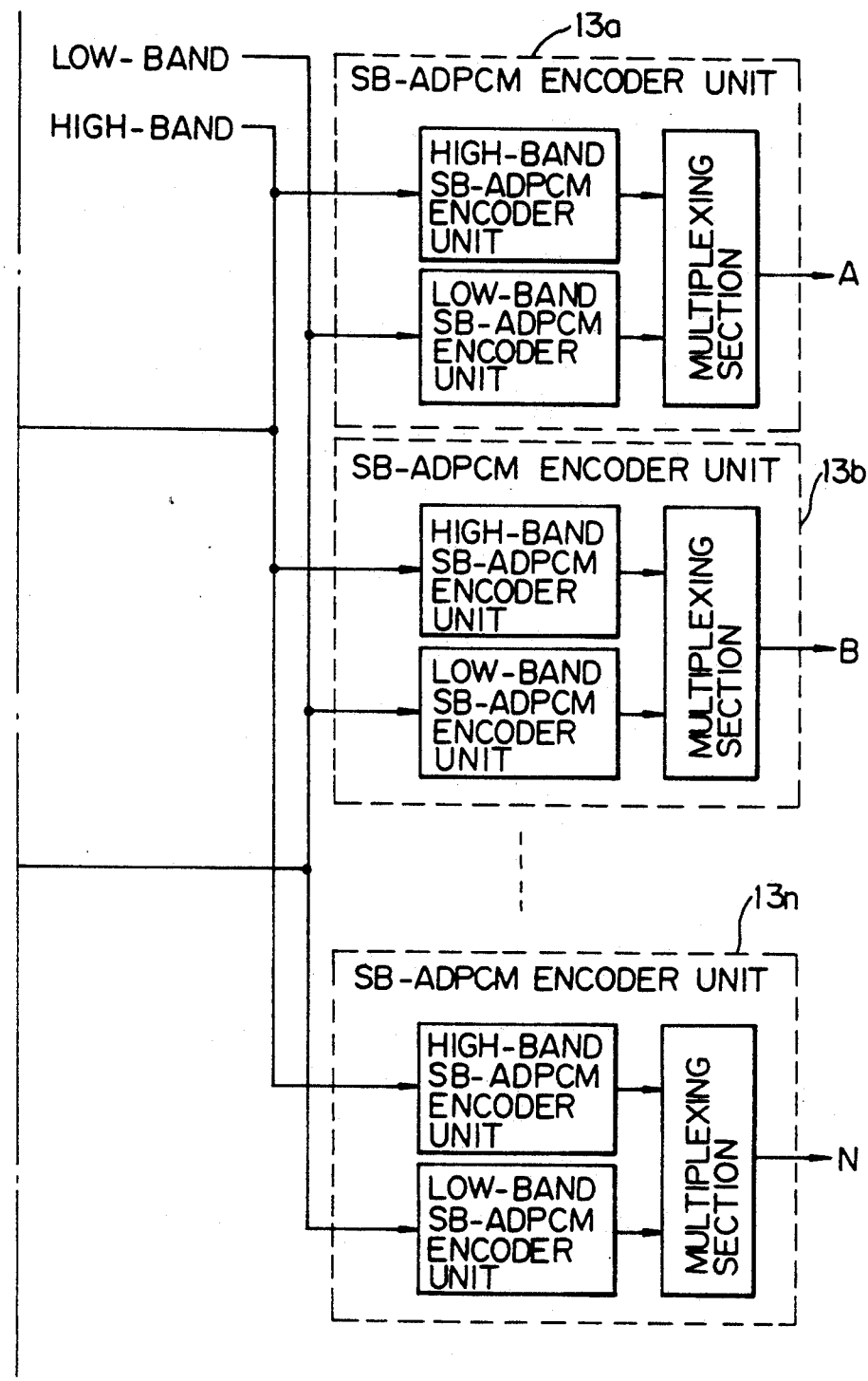
Figure 7:
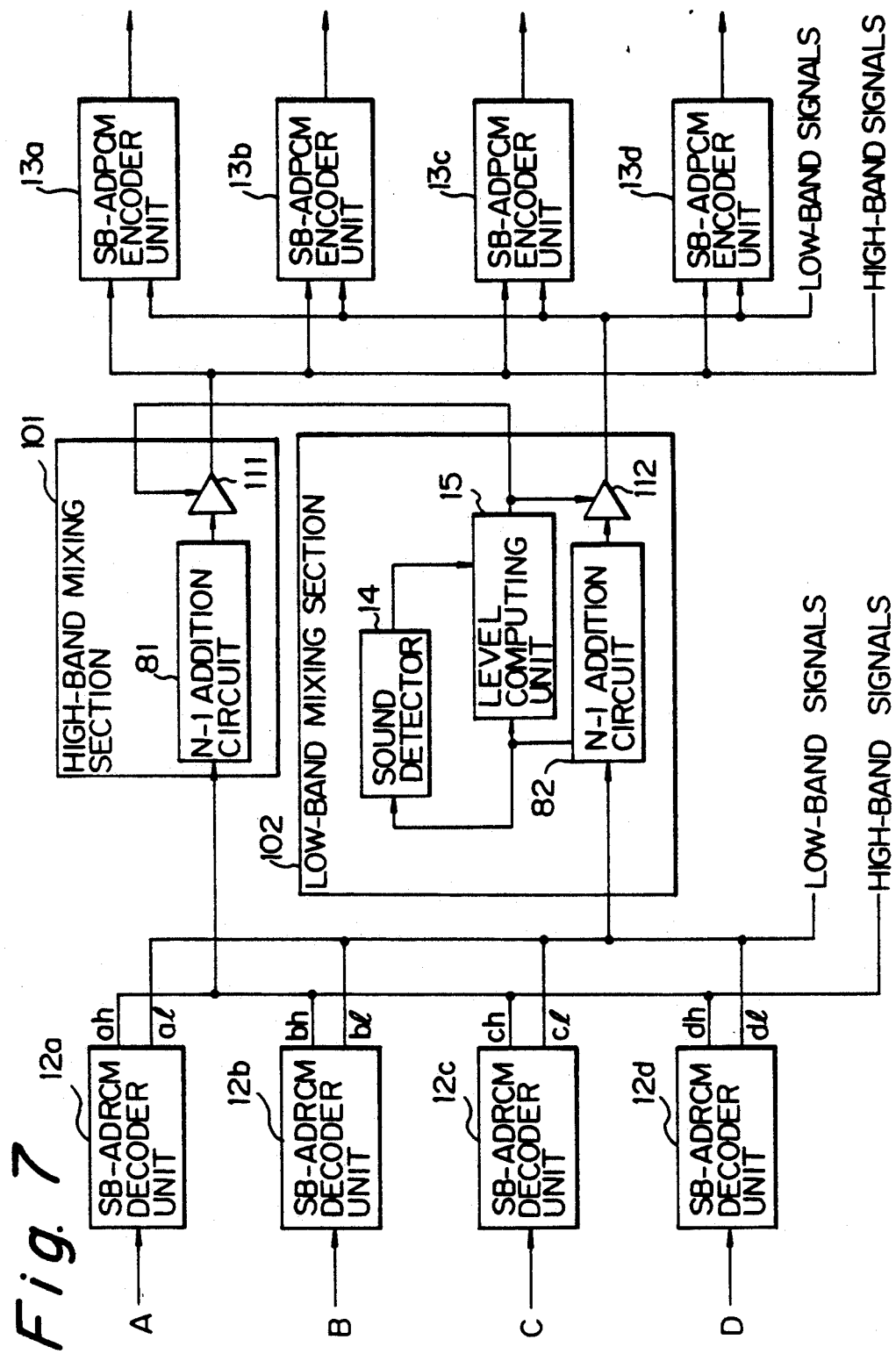
FIG. 7 is a connection diagram of an embodiment according to the present invention.

An embodiment of the present invention will be explained below with reference to the accompanying drawings. FIG. 7 shows an embodiment in which the present invention is realized, which is an audio teleconference apparatus among multi points which uses a 64K bit/s PCM coding system, comprising a voice encoding which complies with CCITT recommendation G.722. The constructions of SB-ADPCM decoder units 12a to 12d are as shown in a decoder unit 12 in FIG. 3. Also, the construction of SB-ADPCM encoder units 13a to 13d are as shown in an encoder unit 13 in FIG. 4. N−1 addition circuits 81 and 82 and a level computing unit 15 correspond to an absolute value circuit 9 and a peak hold circuit 10, both of which are shown in FIG. 2. Level controllers 111 and 112, which are in the form of a variable gain amplifier, have a function comparable to that of a level controllers 11 shown in FIG. 2. The high-band mixing section 101 comprises the N−1 addition circuit 81 and the level controller 111. The low-band mixing section 102 comprises the N−1 addition circuit 82, a sound detector 14, a level computing unit 15, and the level controller 112.

Next, the operation thereof will now be explained in detail with reference to FIG. 7. FIG. 7 is a view showing a case in which a conference call apparatus for four subscribers is realized. If SB-ADPCM codes input from each subscriber are assumed to be A, B, C, and D, they are separated into $a_h$ and $a_l$, $b_h$ and $b_l$, $c_h$ and $c_l$, $d_h$ and $d_l$, at each band by the SB-ADPCM decoder units 12a to 12d disposed in the path for each subscriber. These signals are input to the mixing sections 101 and 102 at each band on a time division basis. First, a predetermined process is performed by N−1 addition circuits 81 and 82. The result of the N−1 addition is output to each subscriber on a time division basis, each of which is applied to the control input terminals of the level controllers 111 and 112. At the same time, the sum of the audio signals of all the subscribers is computed by the N−1 addition circuit 82 and input to the level computing unit 15 and the sound detector 14. A predetermined process is performed by the level computing unit 15 even when the result of the output of the sound detector 14 indicates that only one person is speaking. When no participants are speaking, a process such that the previous output value is maintained is performed.

Signal levels obtained in this manner are applied to both the level controller 112 of the low-band mixing section 102 and the level controller 111 of the high-band mixing section 101, effecting level control. Therefore, the level controllers 111 and 112 control the outputs of the N−1 addition circuits 81 and 82 respectively by using the same gain coefficient value. Thereafter, each of the signals output from the high- and low-band mixing sections 101 and 102 is input to each of the SB-ADPCM encoder units 13a to 13d for each subscriber. After the signals are processed with a predetermined process, they are transmitted again as 64K bit/s SB-ADPCM codes.

As in the above-described embodiment, in an audio signal process in which audio signals are encoded/decoded by using a sub-band coding system, the same advantages as in the conventional process can be obtained by performing N−1 voice addition at each frequency band, by computing a gain coefficient value by detecting voices on the basis of the signal level in the low-band section where signal power is concentrated without synthesizing all frequency bands, and by automatically controlling the level of the audio signals in both high- and low-band in each signal process, for example, in a conference call system in which a multipoint broadcast communication using an SB-ADPCM coding system is performed. In addition, extra hardware is not required, and advantages such as these features described in (1) to (3) below that the sub-band coding system possesses can be utilized can be obtained:

(1) Conference call apparatuses can be miniaturized because no sub-band and band synthesizing filters are required.
(2) Signal distortion and increased delay can be prevented because no filters are required.
(3) Easier echo control is possible by being performed in each band.

The audio teleconference apparatus in which the SB-ADPCM coding system which complies with the CCITT recommendation G.722 is applied has been explained. The same advantages can be obtained by means other than the SB-ADPCM coding system, and can be obtained commonly in a case where the sub-band coding system is employed. Also, not only in an audio teleconference apparatus but also in other communication apparatuses requiring a voice detector or a voice level computing unit, for example, an echo prevention process required for an echo canceller, the amount of computation and required memory capacity can be reduced by the sub-band coding system. Furthermore, the same effect as in the non-subband coding system can be achieved by referring to only signals of bands in which signal power is concentrated during the detection of cross talk. A coding system which is divided into three or more bands can also be effectively applied to composite outputs in which one band thereof or bands having signal power sufficient for detecting voice sounds and computing the voice level are synthesized.

Many different embodiments of the present invention may be constructed without departing from the spirit and scope of the present invention. It should be understood that the present invention is not limited to the specific embodiments described in this specification, and is only limited in the appended claims.

What is claimed is:

1. A method of processing audio signals in a sub-band coding system comprising the steps of:
    inputting non-linear audio signals;
    separating each non-linear audio signal into a plurality of frequency band signals;
    decoding each frequency band signal into a plurality of decoded linear signals;
    performing a predetermined computation on the decoded linear signals to generate computed linear signals;
    reproducing said non-linear audio signals by encoding and multiplexing the computed linear signals,
    said method characterized by including the steps of:
    selecting at least one decoded linear signal in which audio signal power is concentrated;
    detecting sound levels in the selected decoded linear signals; and
    applying the detected sound levels to the computed linear signals.

2. The method of processing audio signals according to claim 1, wherein said predetermined computation process is an N-1 addition process for the decoded linear signals for the purpose of holding an audio teleconference among at least two locations, where N is the number of conference participants.

3. A method of processing audio signals in a sub-band coding system comprising the steps of:
    inputting non-linear audio signals;
    separating each non-linear audio signal into a plurality of frequency band signals;
    decoding each frequency band signal into a plurality of decoded linear signals;

performing a predetermined computation on the decoded linear signals to generate computed linear signals;

reproducing said non-linear audio signals by encoding and multiplexing the computed linear signals, said method characterized by including the steps of:

selecting at least one decoded linear signal in which audio signal power is concentrated;

determining a gain coefficient of the selected decoded linear signals; and controlling the level of the computed linear signals with the gain coefficient.

4. The method of processing audio signals according to claim 3, wherein said predetermined computation process is an N-1 addition process for the decoded linear signals for the purpose of holding an audio teleconference among at least two locations, where N is the number of conference participants.

5. A method of processing audio signals in a sub-band coding system comprising the steps of:

inputting non-linear audio signals;

separating each non-linear audio signal into a plurality of frequency band signals;

decoding each frequency band signal into a plurality of decoded linear signals;

performing a predetermined computation on the decoded linear signals to generate computed linear signals;

reproducing said non-linear audio signals by encoding and multiplexing the computed linear signals, said method characterized by including the steps of:

selecting at least one decoded linear signal in which audio signal power is concentrated;

detecting sound levels in the selected decoded linear signals and utilizing the sound levels to determine a gain coefficient; and controlling the level of the computed linear signals with the gain coefficient when the sound levels have been detected.

6. A method of processing audio signals in a sub-band coding system comprising the steps of:

inputting non-linear audio signals;

separating each non-linear audio signal into a plurality of frequency band signals;

decoding each frequency band signal into a plurality of decoded linear signals;

performing an N-1 addition process to the decoded linear signals to generate computed linear signals, the N-1 addition process for the purpose of holding an audio teleconference among at least two locations, where N is the number of conference participants;

selecting at least one decoded linear signal in which audio signal power is concentrated;

detecting sound levels in the selected decoded linear signals and utilizing the sound levels to determine a gain coefficient;

controlling the level of the computed linear signals by applying the determined gain coefficient to the computed linear signals when the sound levels have been detected; and reproducing said non-linear audio signals by encoding and multiplexing the computed linear signals.

7. An apparatus for processing audio signals, comprising:

means for receiving non-linear wide-band audio signals;

means for separating each non-linear audio signal into a plurality of frequency band signals;

means for decoding each frequency band signal into a plurality of decoded linear signals;

means for performing a predetermined computation on the decoded linear signals to generate computed linear signals;

means for reproducing the non-linear audio signals by encoding and multiplexing the computed linear signals, means for selecting at least one decoded linear signal in which audio signal power is concentrated;

means for detecting sound levels in the selected decoded linear signals; and means for applying the detected sound levels to the computed linear signals.

8. The apparatus for processing audio signals as claimed in claim 7 wherein said means for performing a predetermined computation includes means for performing an N-1 addition process for the decoded linear signals for the purpose of holding an audio teleconference among at least two locations, where N is the number of conference participants.

9. An apparatus for processing audio signals, comprising:

means for receiving non-linear audio signals;

means for separating each non-linear audio signal into a plurality of frequency band signals;

means for decoding each frequency band signal into a plurality of decoded linear signals;

means for performing a predetermined computation on the decoded linear signals to generate computed linear signals;

means for reproducing said non-linear audio signals by encoding and multiplexing the computed linear signals, means for selecting at least one decoded linear signals in which audio signal power is concentrated;

means for detecting sound levels in the selected decoded linear signals and for generating a gain coefficient therefrom; and means for controlling the level of the computed linear signals with the gain coefficient when the sound levels have been detected.

* * * * *